Aug. 25, 1959     R. G. CANNING     2,901,732
ELECTRONIC SORTER Filed June 28, 1954     7 Sheets-Sheet 1

RICHARD G. CANNING,
INVENTOR

HUEBNER, BEEHLER,
WORREL & HERZIG,
ATTORNEYS.

Aug. 25, 1959  R. G. CANNING  2,901,732
ELECTRONIC SORTER
Filed June 28, 1954  7 Sheets-Sheet 7

RICHARD G. CANNING,
INVENTOR.

HUEBNER, BEEHLER,
WORREL & HERZIG,
ATTORNEYS.

United States Patent Office 2,901,732
Patented Aug. 25, 1959

2,901,732

ELECTRONIC SORTER

Richard G. Canning, Venice, Calif., assignor to The Regents of The University of California, a corporation of California Application June 28, 1954, Serial No. 439,709

4 Claims. (Cl. 340—174)

The present invention relates to an electronic sorting machine operating on the principle of sorting by comparison or sorting by collating.

An object of the invention is to provide a speedy, economical unit for sorting and/or collating of digital numeric or alphabetic information stored or recorded on such devices as magnetic tapes.

A brief description of the principle of operation of the machine of the invention is as follows:

(1) Assume that digital numeric information to be sorted is in two input magnetic tapes, and it is desired to arrange it in ascending sequence on one tape.

(2) Looking at the first number from each input tape, choose the smaller of the two and transfer it to the first position in one of the output tapes. The vacancy left by transferring this number is then filled by the second number in that input tape.

(3) Next, compare the first numbers in both input tapes with the number just transferred. If both are larger than the number just transferred, choose the smaller of the two and transfer it to the second position of the output tape chosen. If only one of the two input numbers is larger than the first number transferred, then it is the one to be transferred. The principle here is to continue to build up an ascending sequence in the first output tape as long as possible.

(4) Finally, a time will come when the first numbers in the input tapes are both smaller than the last number transferred. Then the smaller one is chosen and is transferred to the first position of the other output tape. Again, an ascending sequence is built up in the second output tape as long as possible. And again, when the time comes that both input numbers are smaller than the last number transferred, a new sequence is started on the first output tape. In general, whenever a new sequence must be started, switch is made to the other output tape.

(5) After all numbers have been transferred from the input tapes, and are now stored in the output tapes, these output tapes become the input tapes for the next "pass." This may call for electronically transferring numbers or changing tapes.

(6) It will be noticed that this method of sorting is independent of the number size, as long as this size is within the limits of the arithmetic unit of the machine. In fact, the number of passes depends only on the number of items to be sorted. If there are less than $2^n$ items to be sorted, it will take no more than $n$ passes to sort them.

Since only three numbers are under consideration at any one time (the two input numbers and the last number transferred), there are six possible permutations. For purposes of description, the two input numbers will be designated X and Y, and the number last transferred Z; A and B will define the two output registers, in the special sense that A is the same register to which the last number was transferred, and B is the other register. Thus the designation A will be applied to both of the output registers at different times, as the output is switched from one to the other. If zero is considered to be a positive number, the six mutually exclusive cases are:

| Case | If— | Then Transfer— | To Output— |
|---|---|---|---|
| 1 | X>Z>Y | X | A |
| 2 | Y>X>Z | X | A |
| 3 | X>Y>Z | Y | A |
| 4 | Y>Z>X | Y | A |
| 5 | Z>Y>X | X | B |
| 6 | Z>X>Y | Y | B |

Based on the above cases, it will be seen that the six possible occurrences can cause four different actions: (1) transferring X to the same output register as the last number; (2) transferring Y to the same register; (3) transferring X to the other output register, or (4) transferring Y to the other output register. The circuitry to select which of these four events should take place will be described next with reference to the drawings.

The tape drives 1, 2, 3, and 4 (Figure 1) are controlled from the Control and Master Oscillator, as indicated. When an input tape is started, synchronization between the repetition frequency from the tape and the internal clock frequency is provided by the buffer register ($BR_1 \ldots 4$). It is presumed that the binary digits representing one character are read from the tape at one time, into the buffer register, $BR_1$ or $BR_2$, and thence to one of the recirculating registers ($M_a \ldots d$). The recirculating registers will each store a number of "words" or groups of characters, which are to be sorted; this number may be in the order of 8 or 10.

Figure 1:
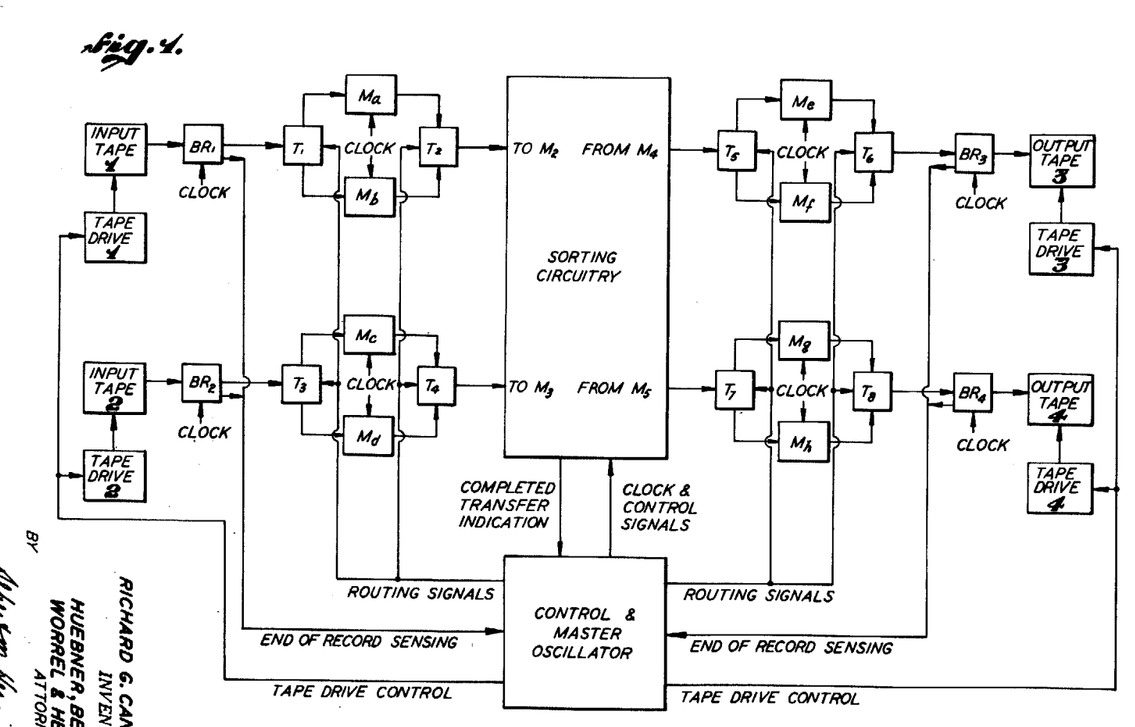
Figure 1 is an overall block diagram showing the sorting unit.

When one of the recirculating registers is filled, say $M_a$, the Control then proceeds to fill the alternate recirculating register, $M_b$ under the direction of the Routing Signals issuing from the Control and Master Oscillator. Later, after all of the "words" have been emptied from $M_a$, the sorting circuitry is connected to $M_b$, Tape Drive 1 is started, and $M_a$ is refilled. The same type of process is repeated when $M_b$ is emptied.

This principle of operation applies to the other input tape unit, and also to the output tape units.

An "end of record" signal is presumed to have been recorded on each tape, following the last word on that tape. When this signal is sensed by Control from an input tape, that tape drive is inhibited from further action during the present sorting cycle. These "end of record" signals are processed by the sorting circuitry and fed to the output tapes, as are regular words. When sensed on the output tape, they indicate to Control that the present cycle of operation is completed, and the next cycle can begin.

Figure 2:
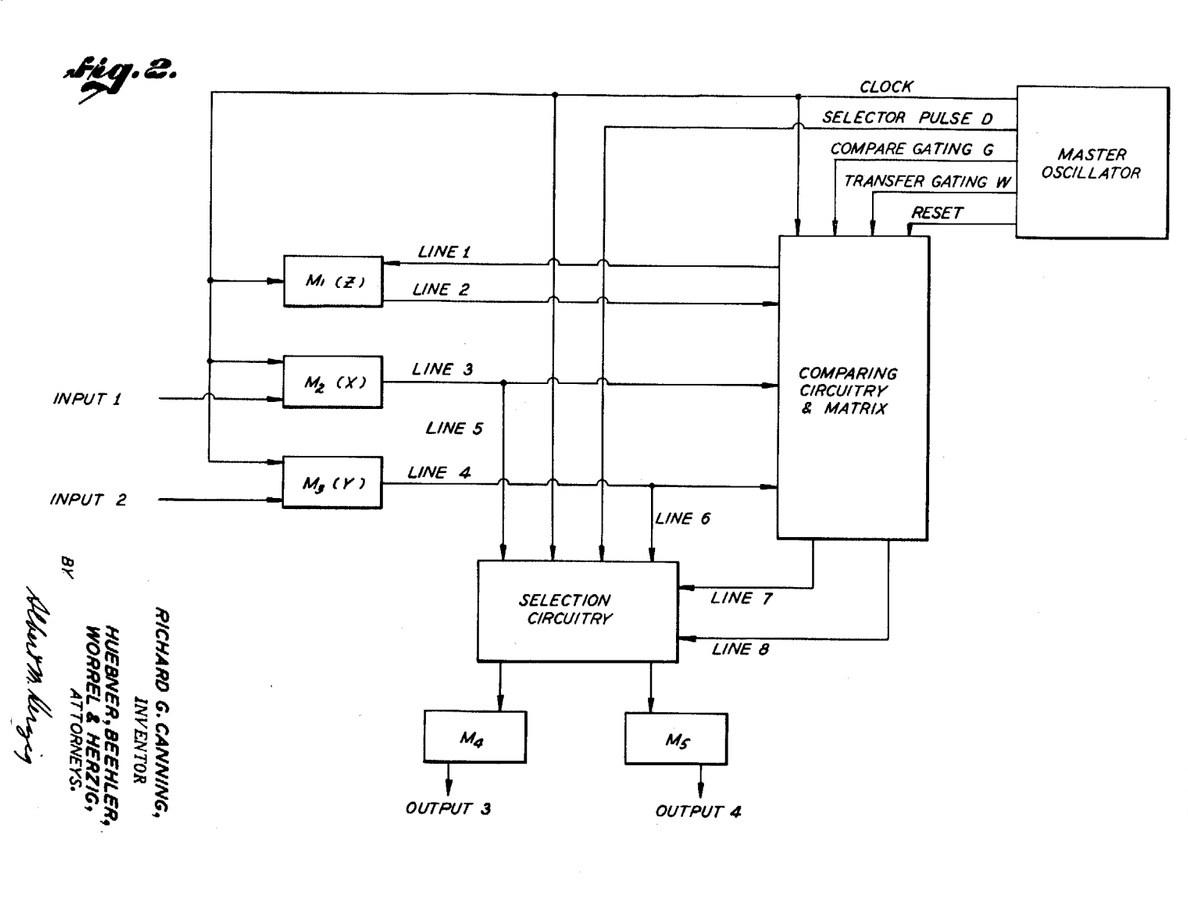
Figure 2 illustrates diagrammatically the manner in which the master oscillator is connected to the sorting circuitry.

Figure 2 illustrates the manner in which the Master Oscillator is connected to the sorting circuitry. The two numbers X and Y are read into the non-volatile registers $M_2$ and $M_3$ from an outside storage medium such as magnetic tape. The number which was last transferred, Z, is stored in the non-volatile register $M_1$.

The three numbers, X, Y, and Z, are fed into the comparing circuitry and matrix, shown on the right of the diagram. This circuitry determines which of the six cases applies, and delivers the necessary control signals to the selection circuitry via lines 7 and 8. The numbers X and Y are again read out of the registers $M_2$ and $M_3$ to the selection circuitry (lines 5 and 6); due to the control signals (line 7 and line 8), however, only one of them gets through and it is directed to the proper output register, $M_4$ or $M_5$.

Figure 3:
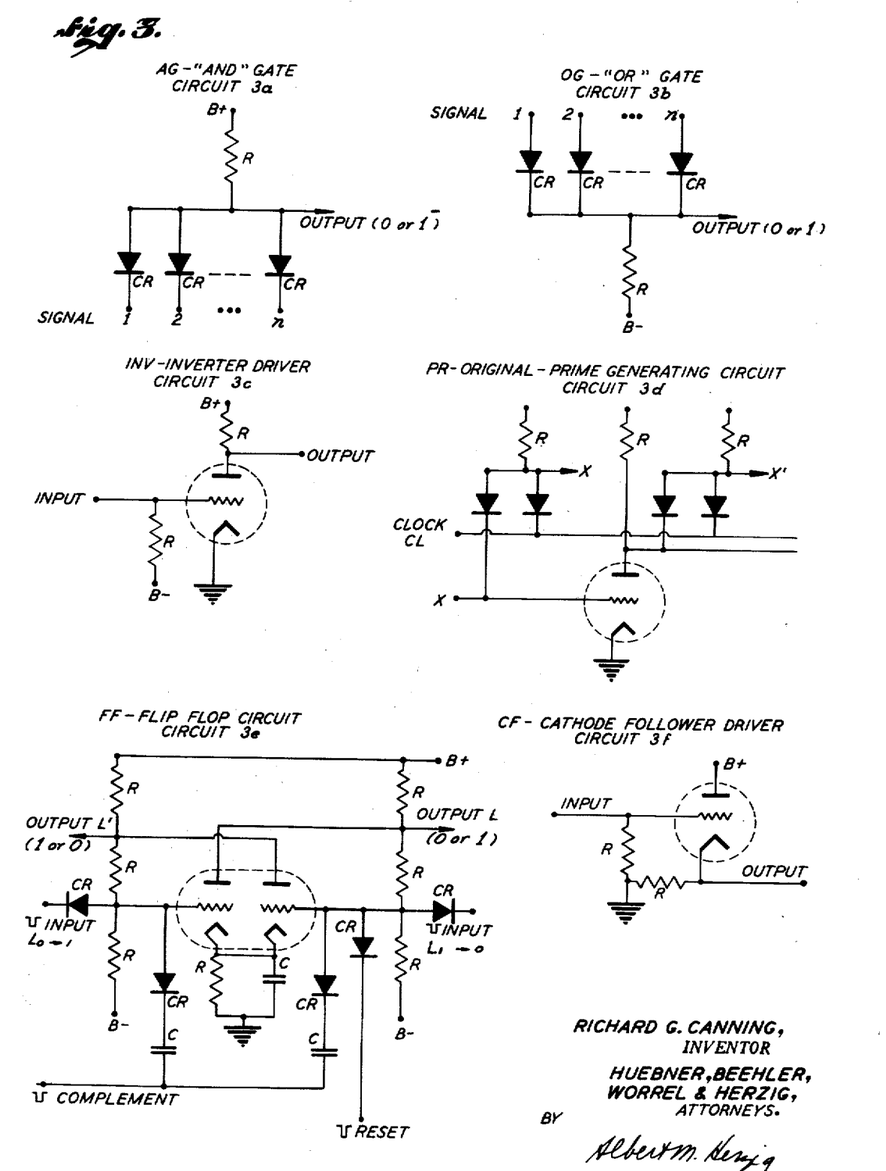
Figure 3 diagrammatically shows the circuit details of the major circuits used in the sorting machine.

Figure 3 shows the circuit details of the major repetitive circuits that are used in the machine. These circuits are known to the art. Circuit 3a is a crystal diode binary "and" gate, so named because all signals must be in the "true" state to give a "true" output. Circuit 3b is a diode "or" gate, which gives a true signal output when one or more of the inputs is in a true state.

The operation of these gates is as follows:

In the "and" gate, it will be seen that the output signal will rise to the B+ voltage only when none of the crystal diodes CR are conducting—that is, when all of the input signals are essentially at the B+ level. If any of the input signals is at a low (or B−) level, a conducting path will be provided from B+ to B−, and the voltage drop across resistor R will cause the output signal to be approximately B− (neglecting the small voltage drop in the crystal diodes). Thus if the input signals swing between B+ (or 1) and B− (or 0), it will be seen that the output signal will be 1 only when all of the inputs are 1, (signal 1 and signal 2 and . . . and signal n are all 1) and will be 0 when one or more of the inputs is 0.

In the "or" gate, the output is tied to the B− (or 0) level through resistor R. As long as all of the input signals are at the B− (or 0) level, the output will be 0. However, when any one of the input signals rises to the B+ (or 1) level, a conducting path between B+ and B− is provided, and the output signal will rise to the 1 level. Thus, when signal 1 or signal 2 or . . . or signal n are at level 1, then the output will be at level 1.

Circuit 3c is an inverter circuit, used in conjunction with other circuits for producing "primed" signals (which are true when the original signal is false, and vice versa) and also for driving flip flop circuits with negative "true" pulses. Although not shown in the following circuit diagrams, an inverter is used on the input to all flip flop circuits. Circuit 3d produces both original and primed signals, from a combination of gates and an inverter. Circuit 3e is the well-known Eccles-Jordan flip flop circuit, with inputs for complementing and resetting as well as the single directional inputs. On receipt of the negative reset impulse, the right hand tube of the flip flop is turned off, with its plate at a high potential, so that output L' is high (=1) and output L is low (=0); in this state, the flip flop is considered to be "off." If a negative impulse is received on the left hand grid, output L becomes high, and the flip flop is considered to be "on." A complementing impulse will cause the flip flop to reverse its state, regardless of which of the two states it is in. Circuit 3f is a cathode follower buffer circuit: although not shown in the following circuit diagrams, a cathode follower is used on the output of all registers and of all flip flop circuits.

Figure 4:
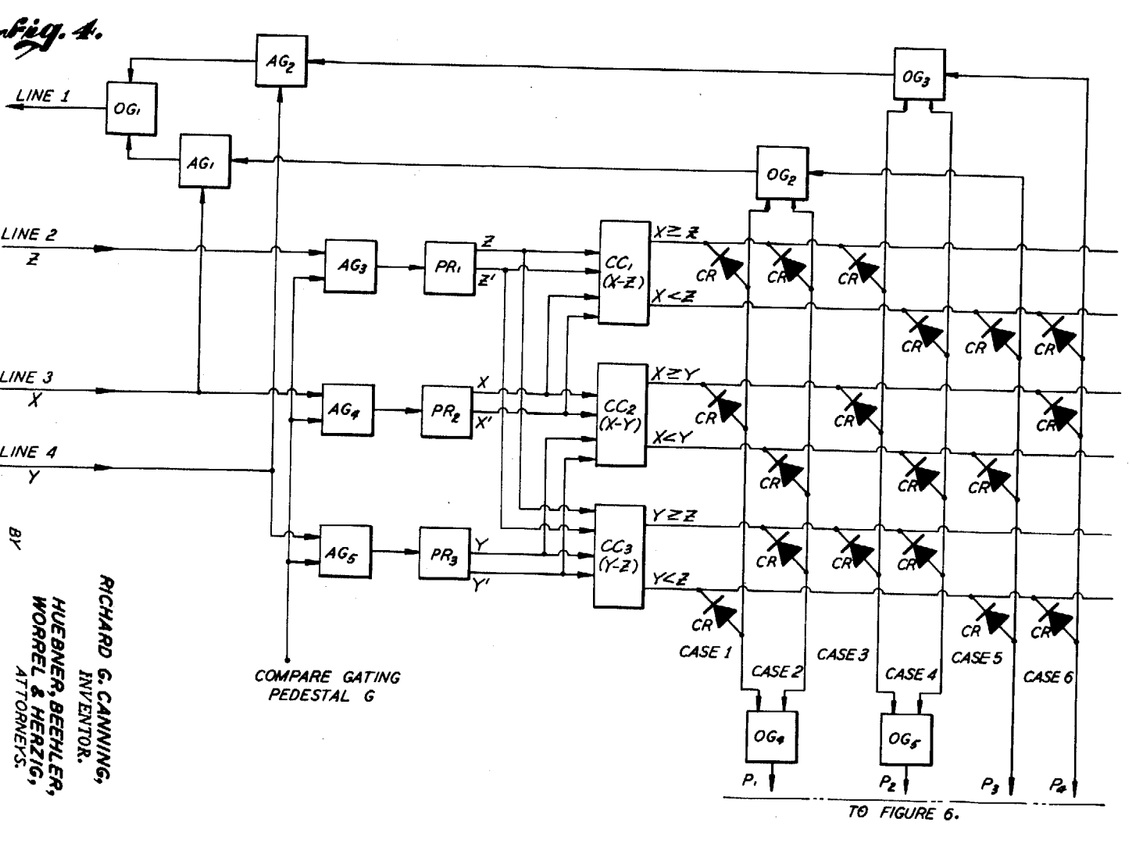
Figure 4 diagrammatically shows in more detail the comparing circuitry and matrix block shown in Figure 1.

Figure 4 is a more detailed diagram of the comparing circuitry and matrix block shown in Figure 1. The three numbers, Z, X, and Y, are fed in on the lines 2, 3, and 4, respectively. And gates $AG_3$, $AG_4$, $AG_5$ allow the numbers to pass only during the comparing part of the cycle of operations, as determined by the compare gating pedestal, G. The numbers are also fed to and gates $AG_1$ and $AG_2$, the action of which will be described shortly.

After passing and gates $AG_3$, $AG_4$, $AG_5$, the three numbers enter three original-prime generating circuits. In each case, the output is the original number and the prime of the original number. The numbers are now ready to be fed into the three comparing circuits $CC_1$, $CC_2$, $CC_3$, to be described below. The purpose of these comparing circuits is to determine the relative magnitudes of X and Y, X and Z, and Y and Z. Depending on whether X is greater or less than Z, one or the other of the outputs of $CC_1$ will be true, or "hot." Similarly with $CC_2$ and $CC_3$.

The matrix which is driven by $CC_1$, $CC_2$, $CC_3$, is connected so that only one of the six output lines will be true, depending upon the condition of the three comparing circuits. These six outputs have been numbered Case 1, 2 . . . 6, to agree with the "six mutually exclusive cases" tabulated above. It will be seen that Cases 1 and 2 result in the same action; that of transferring the number X to the same output register (A). Similarly for Cases 3 and 4, for Y.

In addition to determining which number is to be transferred to the output registers, the matrix also conditions and gates 1 or 2, so that the number selected can also be transferred to register $M_1$ (Figure 2) to become the new Z for the next cycle of operation.

Figure 5:
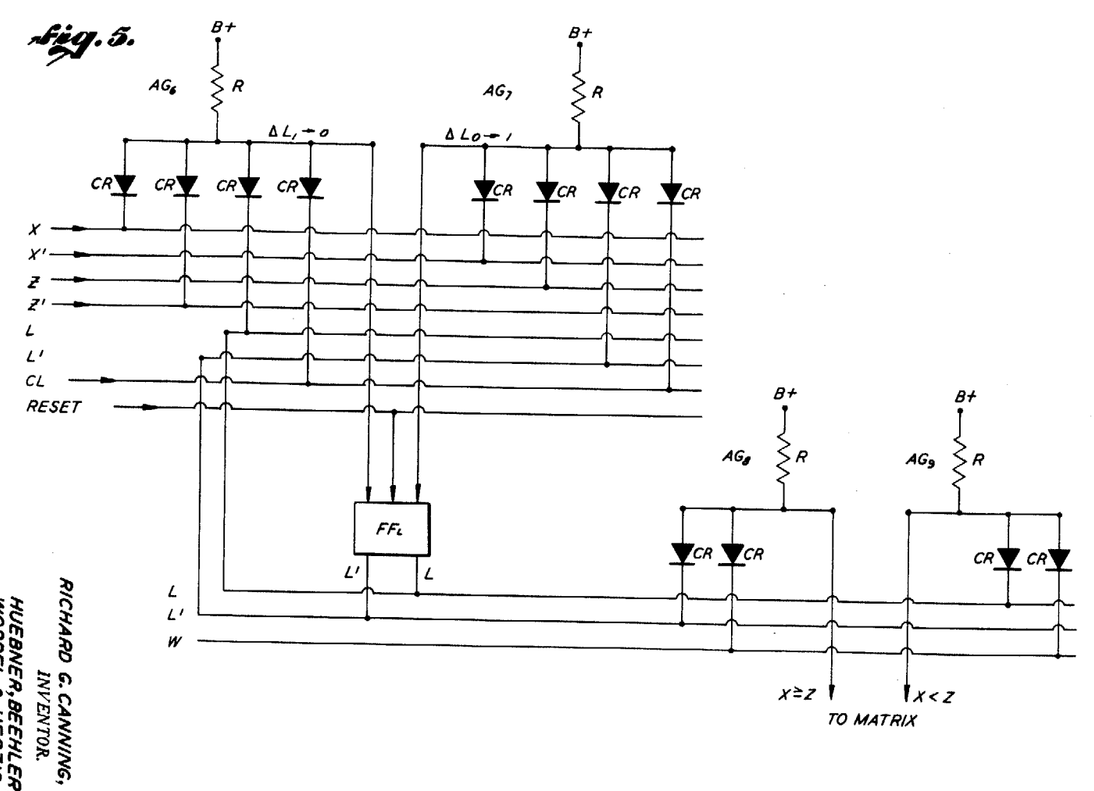
Figure 5 diagrammatically shows the detail circuitry for a typical comparing circuit used in the sorting machine.

Figure 5 shows the detail circuitry for a typical comparing circuit, in this case $CC_1$. Since all that is needed is the relative comparative magnitudes of the numbers, this circuit stores only one binary digit, indicating whether $X \geq Z$, or $X < Z$. This circuit is only the "borrow" circuitry of a subtractor circuit; the actual differences in magnitude between the numbers is ignored. Flip flop $FF_L$, whose construction is indicated in Figure 3e, has two outputs, L and L', one of which is always true (=1) while the other is false (=0). The flip flop is considered to be "off" when $L=0$; also, this "off" condition is to indicate that $X \geq Z$. Thus, output L indicates the presence or absence of a "borrow," a borrow being present when $L=1$, and absent when $L=0$. Since only the borrow circuitry of a subtractor circuit is used, it is necessary only to reset $FF_L$ to the "no borrow" (or "off") condition before two members are to be compared, and then transmit to $FF_L$ only the changes in borrows. And gate $AG_7$ is connected so as to transmit an impulse to $FF_L$, and turn it "on," when the subtraction indicates that a borrow is necessary (indicating $X<Z$, up through the digits compared so far), and where a borrow was not necessary on the previous digits subtracted. And gate $AG_6$ is connected so as to transmit an impulse to $FF_L$, and turn it back "off," when the subtraction indicates that a borrow is no longer necessary (indicating $X>Z$, up through the digits compared so far), and where the borrow was necessary on the previous digits subtracted. The complete action of these three circuits, $AG_6$, $AG_7$, and $FF_L$, is summarized in the following truth table, wherein the "new" value of the L output of $FF_L$ is indicated in the column headed "New Borrow L." The other two output columns in the table indicate what input conditions (X, Z, and L) will cause $FF_L$ to be changed (a change being indicated by a "1" entry). The values of X', Z', and L' are not shown in the table, but are always the opposite of X, Z, and L.

| Input | | | Output | | |
|---|---|---|---|---|---|
| X | Z | Previous Borrow L | New Borrow L | ΔL 0→1 | ΔL 1→0 |
| 0 | 0 | 0 | 0 | 0 | 0 |
| 0 | 0 | 1 | 1 | 0 | 0 |
| 0 | 1 | 0 | 1 | 1 | 0 |
| 0 | 1 | 1 | 1 | 0 | 0 |
| 1 | 0 | 0 | 0 | 0 | 0 |
| 1 | 0 | 1 | 0 | 0 | 1 |
| 1 | 1 | 0 | 0 | 0 | 0 |
| 1 | 1 | 1 | 1 | 0 | 0 |

The "borrow" flip flop $FF_L$ will always be reset to the "no borrow" condition at the end of the cycle, before the next set of numbers is to be processed.

Thus the condition of $FF_L$ will determine whether X is greater than Z or vice versa. If X is greater than Z, $FF_L$ is in the "off" condition, and $L=0$, while $L'=1$. This condition is sensed by means of the transfer gating pedestal signal W (Figure 5) in conjunction with and gate $AG_8$. If X were less than Z, and gate $AG_9$ would be activated. Transfer gating pedestal signal W is supplied by the control and master oscillator circuitry, and becomes "true" after the two numbers X and Z have been completely compared. The purpose of signal W and these two gates is to energize the matrix (Figure 4) only after the numbers have been completely compared, and to keep the matrix energized until X or Y (whichever is selected) is transferred to the output. The time relation of signal W to other control signals will be shown in Figure 7.

Figure 6:
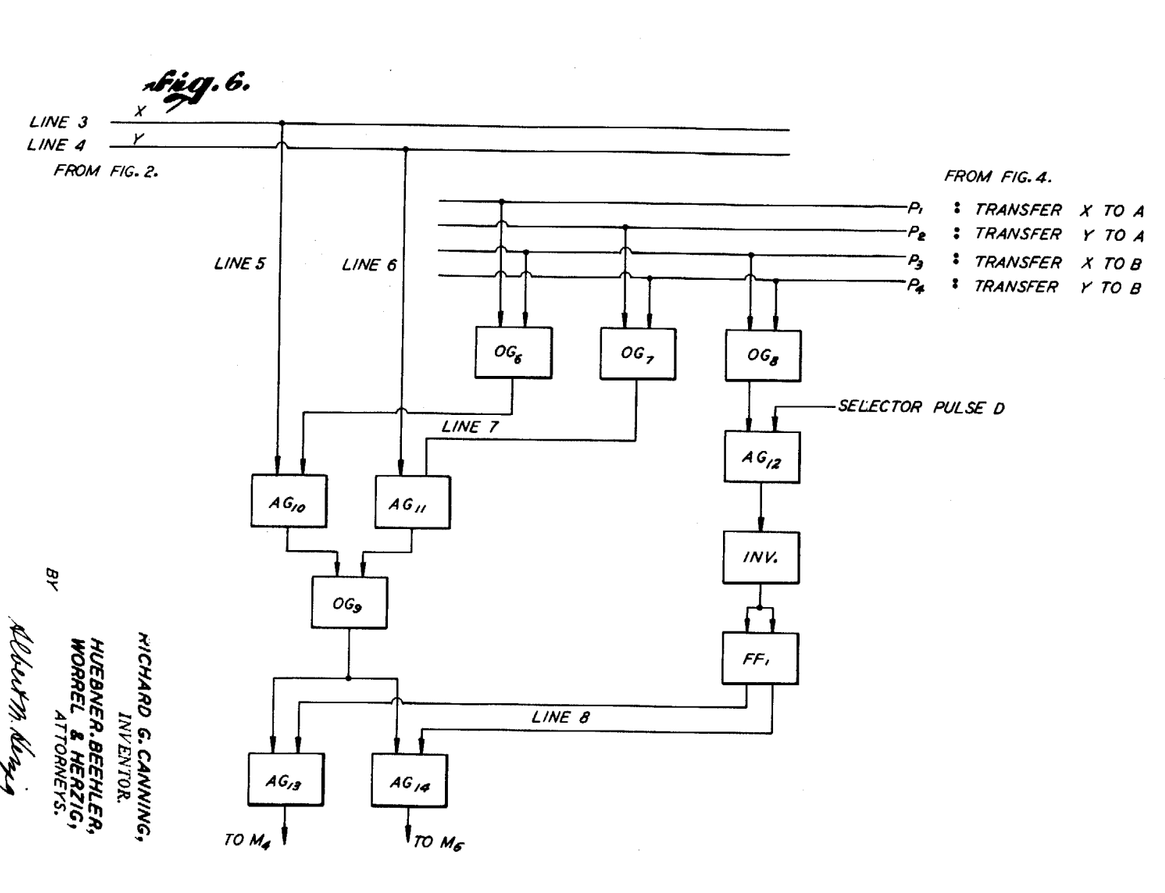
Figure 6 shows a diagram of the selection circuit block in Figure 2.

Figure 6 is a diagram of the selection circuit block in Figure 2. The circuitry performs two functions; (1) the selection is made between X and Y as to which one is to be transferred, depending upon the signal received from the matrix, and (2) the proper output register is selected (the same or the other register) to receive the number which is transferred. The action therefore is similar to two transfer switches in series.

It will be noticed that matrix signals $P_1$ and $P_3$ both involve the selection of X as the number to be transferred and are connected to or gate $OG_6$; matrix signals $P_2$ and $P_4$ involve the selection of Y and are fed to or gate $OG_7$. Thus a true signal will occur from either or gate $OG_6$ or or gate $OG_7$, but not both, and this true signal will condition either and gate $AG_{10}$ or and gate $AG_{11}$. Also, if either matrix signals $P_3$ or $P_4$ occur, it means that the output must be switched to the other register (not the one the last number was transferred to). This is accomplished by using either a $P_3$ or a $P_4$ matrix signal to complement flip flop $FF_1$, in conjunction with selector pulse D. The output of this flip flop is used to condition one or the other of the two and gates $AG_{13}$ or $AG_{14}$.

Figure 7:
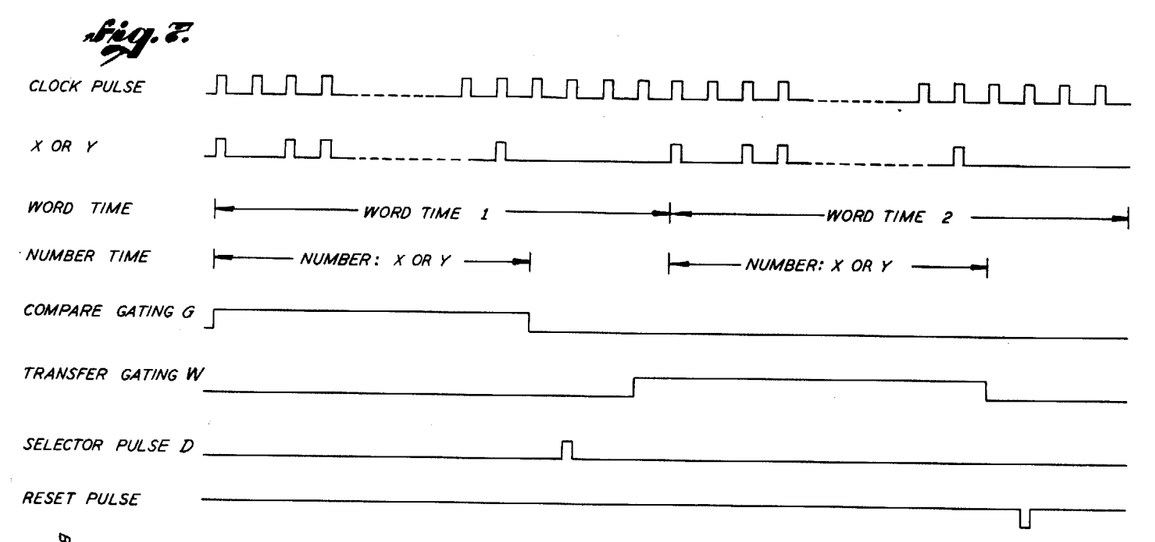
Figure 7 diagrammatically shows a timing chart of the major signals used in the machine.

Figure 7 is a timing chart illustrating the major signals in the machine. It will be seen that one cycle of operation is equal to two word times. During the first word time, the three numbers are compared and the matrix selects the desired action; during the second word time, the actual transfer of X or Y to the desired output takes place. The selector pulse D is used to complement flip flop $FF_1$, when either matrix signals $P_3$ or $P_4$ are present. The reset pulse is used to reset the borrow flip flop $FF_L$ to the "no borrow" condition near the end of the cycle.

The design of the machine of the invention assumes a binary coded representation of the numbers to be sorted. Alphabetical information, or a mixture of alphanumeric information, can be sorted as easily as pure numeric when some logical form of binary representation is used for the alphabet. For example, if six binary digits are used for coding the decimal digits 0 through 9, and the alphabet A through Z, plus special characters, and if "a" is given a numerical code value less than "b," "b" less than "c," and so on, then the comparison principle described above can be performed on letters in the same manner as numbers. One method of performing this would be to allocate code positions 3 through 12 (000011 through 001100) to numbers (the excess-three system), and code positions 20 through 46 for the letters and the space: 20 (010100) for "a"; 21 (010101) for "b," and so on.

While there have been shown and described fundamental novel features of the invention, it will be understood that various changes in the form and details of the device illustrated, and in the operation and application thereof may be made by those skilled in the art without departing from the spirit of the invention. It is the intention, therefore, to be limited only as indicated by the scope of the appended claims.

What is claimed is:

1. Sorting apparatus comprising: first storage means for sequentially storing a plurality of signals representing serially arrangable items of information; second storage means for sequentially storing a second plurality of signals representing serially arrangeable items of information; withdrawal means for withdrawing the leading signals representing serially arrangeable items of inforance with a selected comparison; temporary storage means for storing the signal last withdrawn by said withdrawing means; comparing means for comparing the respective leading signals in said first and second storage means and the signal stored in said temporary storage means, said withdrawal means being responsive to said comparing means for selecting the leading signal from said first or second storage means in accordance with a respective desired serial relation among said leading signals and said signal last withdrawn; fourth and fifth storage means for receiving said selected signals, said comparing means including means for directing the selected signal to said fourth or fifth storage means so as to store therein signals in predetermined serial arrangement in each of said fourth and fifth storage means, as long as such predetermined serial arrangement can be effected.

2. Sorting apparatus for sorting items of information represented by serially arrangeable signals received from two data sources comprising: means for storing as a signal the leading item of information from each of the said two data sources; means for temporarily storing the signal representing the last previously selected item of information, comparing means for comparing signals representing said three items, each with the others; two output means for registering as signals items of sequential information withdrawn from said comparing means; means for feeding as signals said two leading items and said last previously selected item into said comparing means; means for withdrawing the signal representing one of said two leading items from said storing means; and selecting means responsive to said comparing means for selecting which of the signals representing said two leading items is to be withdrawn and transferred and also for determining which of said two output means said last mentioned signal is to be transferred to, the selection being made so as to continue building in the respective said output means predetermined serial arrangement of items as long as such ascending can be accomplished.

3. Sorting apparatus comprising: a plurality of storage means for storing a respective plurality of signals representing serially arrangeable items of information; withdrawal means for withdrawing the leading signal from one of said plurality of storage means in accordance with a selected comparison; temporary storage means for storing the signal last withdrawn by said withdrawing means; comparing means for comparing the respective leading signals in said plurality of storage means and the signal stored in said temporary storage means, said withdrawal means being responsive to said comparing means for selecting the leading signal from said plurality of storage means, in accordance with a respective desired serial relation among said leading signals and said signal last withdrawn; a plurality of output storage means for receiving said selected signals, said comparing means including means for directing the said selected signal to said output storage means so as to store therein signals in predetermined serial arrangement in each of said plurality of output storage means, as long as such arrangement can be effected.

4. Apparatus in accordance with claim 3, where said items of information are represented by binary coded signals and said comparing means constitutes the borrow circuit of a binary subtractor.

References Cited in the file of this patent

UNITED STATES PATENTS

| | | |
|---|---|---|
| 2,617,704 | Mallina | Nov. 11, 1952 |
| 2,623,171 | Woods-Hill et al. | Dec. 23, 1952 |
| 2,628,346 | Burkhart | Feb. 10, 1953 |
| 2,674,733 | Robbins | Apr. 6, 1954 |
| 2,735,082 | Goldberg et al. | Feb. 14, 1956 |

OTHER REFERENCES

Mauchly: Sorting and Collating, Theory and Techniques for Design of Electronic Digital Computers, Moore School of E.E., Univ. of Penn., volume III, June 30, 1948, pages 22–1 to 22–20.